US010006100B2

(12) United States Patent
Imris et al.

(10) Patent No.: US 10,006,100 B2
(45) Date of Patent: Jun. 26, 2018

(54) PLASMA INDUCED FUMING

(71) Applicant: Val'Eas Recycling Solutions AB, Hofors (SE)

(72) Inventors: Matej Imris, Gävle (SE); Sven Santén, Hofors (SE); Bror Magnus Heegard, St Germain en Laye (FR)

(73) Assignee: VAL'EAS RECYCLING SOLUTIONS AB, Hofors (SE)

( * ) Notice: Subject to any disclaimer, the term of this patent is extended or adjusted under 35 U.S.C. 154(b) by 93 days.

(21) Appl. No.: 14/429,561

(22) PCT Filed: Aug. 29, 2013

(86) PCT No.: PCT/SE2013/051014
§ 371 (c)(1),
(2) Date: Mar. 19, 2015

(87) PCT Pub. No.: WO2014/046593
PCT Pub. Date: Mar. 27, 2014

(65) Prior Publication Data
US 2015/0232961 A1   Aug. 20, 2015

(30) Foreign Application Priority Data
Sep. 21, 2012 (SE) ...................... 1251067

(51) Int. Cl.
C22B 5/00 (2006.01)
C22B 5/16 (2006.01)
C22B 9/16 (2006.01)
C22B 7/04 (2006.01)
F27B 1/10 (2006.01)
B01J 6/00 (2006.01)

(52) U.S. Cl.
CPC ............. *C22B 5/16* (2013.01); *B01J 6/00* (2013.01); *C22B 7/04* (2013.01); *C22B 9/16* (2013.01); *F27B 1/10* (2013.01)

(58) Field of Classification Search
CPC ..... C22B 15/0054; C22B 7/04; C22B 11/023; C22B 15/006; C22B 23/02
USPC .................................. 75/528, 548
See application file for complete search history.

(56) References Cited

U.S. PATENT DOCUMENTS 3,407,060 A * 10/1968 Lumsden ................ C22B 19/08
                                                 75/660
3,891,428 A    6/1975 Yordanov et al.
3,892,559 A *  7/1975 Quarm ..................... C22B 5/00
                                                 266/221
4,252,563 A    2/1981 Sundstrom
4,397,688 A *  8/1983 Schwartz ................ C22B 13/02
                                                 75/696
4,571,260 A    2/1986 Johansson et al.
4,588,436 A *  5/1986 Eriksson .................. C22B 5/02
                                                 75/10.19
4,655,437 A    4/1987 Fritz et al.
5,203,908 A    4/1993 Lindsay et al.
5,372,630 A   12/1994 Foo et al.
5,888,270 A *  3/1999 Edwards ............... C22B 15/003
                                                 75/377
5,942,023 A    8/1999 Bitler et al.
6,261,340 B1*  7/2001 Edlinger .................. C22B 7/04
                                                 75/434
6,289,034 B1   9/2001 Bates
2007/0095169 A1* 5/2007 Van Camp ............. C22B 4/005
                                                 75/631
2010/0050814 A1  3/2010 Van Camp et al.
2010/0242676 A1  9/2010 Roth et al.

FOREIGN PATENT DOCUMENTS

| GB | 2181746 A | 4/1987 |
| GB | 2297559 A | 8/1996 |
| JP | 6-502220 A | 3/1994 |
| WO | 88/01654 * | 3/1988 |
| WO | 91/08317 A1 | 6/1991 |
| WO | 92/08815 A1 | 5/1992 |
| WO | 2005/031014 A1 | 4/2005 |
| WO | 2008/052661 A1 | 5/2008 |

OTHER PUBLICATIONS

N. Venkatramani, Industrial plasma torches and applications, Current Science, vol. 83, 3:254-262 (Aug. 10, 2002).
Supplementary European Search Report from corresponding European Application No. 13838833, dated May 12, 2016.
Official Action dated Aug. 4, 2017 from corresponding JP 2015-533013, and machine English translation.

* cited by examiner

*Primary Examiner* — Steven J Bos
(74) *Attorney, Agent, or Firm* — Porter Wright Morris & Arthur LLP

(57) ABSTRACT

A method for recovery of evaporable substances comprises melting (210) of a material comprising evaporable metals and/or evaporable metal compounds into a molten slag. The molten slag is agitated (212) by a submerged jet of hot gas. The hot gas is controlled (214) to have an enthalpy of at least 200 MJ/kmol, and preferably at least 300 MJ/kmol. At least a part of the evaporable metals and/or evaporable metal compounds are fumed off (216) from the molten slag. An arrangement for the method is based on a furnace with a plasma torch submerged into molten slag in the furnace.

24 Claims, 2 Drawing Sheets

PLASMA INDUCED FUMING

TECHNICAL FIELD

The present invention relates in general to arrangements and methods for recovery of evaporable substances, and in particular to arrangements and methods for plasma induced fuming.

BACKGROUND

During many years, recovery of metal values from metallurgical waste materials has been developed. Such recovery is beneficial for many reasons. One is that waste materials, e.g. EAF (Electric Arc Furnace) dust, and slag of different kinds often contains such high amounts of heavy metals that they are unsuitable for immediate deposition. Rest products comprising elements like Sn, Zn and Pb are preferably not returned in to the nature without any protective treatment. Furthermore, the value of these elements is also not negligible. By recovering these elements, the environment is saved at the same time as useful metals are obtained.

It is since long known to use different types of fuming processes to recover evaporable substances both from primary sources, such as roasted Zn ores and from secondary sources, such as EAF dust, leaching residues and secondary slags. A typical simple slag fuming process produces a molten metallurgical slag. The slag is typically exposed to reducing agents and is heated to relative high temperatures. Vapours of volatile metals, such as e.g. zinc and lead, are transferred into the gas phase above the slag and the vapours are removed for further treatment to obtain the metallic components. One typical such example is found e.g. in the published patent application GB 2 181 746 A or the U.S. Pat. No. 5,942,023.

In the U.S. Pat. No. 4,571,260, a method for recovering metal values from materials containing tin and/or zinc is disclosed. The method is basically a Kaldo process where a surface of a rotating slag bath is exposed for oxygen and fuel. Flux and coke are added to achieve a suitable viscosity and appropriate agitation.

A disadvantage with most early slag fuming arrangements is that the efficiency in removing the volatile metals was not always the best. Relatively high contents of hazardous substances were remaining in the final slag.

Today literature and operational practice often mention and apply high temperature treatment of volatile containing materials. The high temperatures are necessary to ensure high fuming rates and high yields. As an example Zn fuming from fayalite slags can be used. Here the slag is superheated above its normal melting point of 1100° C. This superheating of the slag results in excellent fuming, however, it results also in high refractory wear and higher energy consumption of the process.

Water cooled vessels are typically used to overcome the short lifecycle of the refractory, however, at a high cost of heat loss that comes with it. Therefore the smelters typically have to compromise between high wear, low fuming rates and high heat losses.

The above mentioned issues with high refractory wear and high energy cost were addressed in published international patent application WO 2005/031014. There, high Zn fuming rates without any need to superheat the slag are described. According to that approach, the melting point of the slag is increased to 1300° C. by adding suitable fluxes. By doing so, there is limited or no need for the slag to be superheated to obtain high fuming rates. The reason is that the desired temperature for high fuming rates is typically around 1300° C., and since the melting point of the slag is around 1300° C., superheating is typically not necessary. Such a slag is said to build a protective freeze lining on top of the refractory on water cooled walls and this approach therefore minimizing the wear of the lining. The fuming process according to WO 2005/031014 however comes at the cost of energy needed to heat all of the slag volume in the reactor up to 1300° C., and at the cost for fluxes that need to be added to increase the melting point of the slag.

Another approach is disclosed in the published U.S. Pat. No. 4,252,563. There it is described a continuous of slag fuming process where the slag is fumed in two consecutive slag treatment zones. In the first zone, the slag is subjected to heat treatment for fuming off volatile, preferably sulphide bound, constituents. In the subsequent second furnace zone, the slag is subjected to reduction treatment, where oxides are reduced to their elementary form and fumed off. If the slag is subjected to further separation after the fuming process, it can be subjected to a further $3^{rd}$ zone for copper recovery. However this $3^{rd}$ zone has again to be heated since the temperature of the slag after zone 2 drops considerably. The slag temperature is adjusted in the first zone so that the reduction and fuming treatment in the second zone can be carried out essentially without any further heating of the slag. Preheated air and pulverized coal is used for heating the slag, giving the process a need for a robust off-gas system. Utilization of coal as fuel gives the process limitations for energy input and oxygen potential. At relatively strong reduction conditions, huge amounts of coal have to be supplied to cover the energy demand for heating and reduction. This gives rise to very high amounts of exhausted greenhouse gases.

The use of submerged plasma torches generating a gas agitating the slag bath and for feeding of reducing agents is known, e.g. as disclosed in the published US patent application US 2010/0050814.

Despite the development in this technical area, there are still remaining problems. In particular, by solving the earlier problems with lining wear and fuming rate, the costs for fluxes, heating and cooling is increased, as well as, in some cases, the high emissions of carbon oxides.

SUMMARY

A general object of the present invention is to improve recovery of evaporable substances. A particular object of the present invention is to reduce the use of slag formers, to reduce the requested amount of supplied energy and still ensure a low wear on the refractories in the reactor.

The above objects are achieved by arrangements and methods according to the enclosed independent claims. Preferred embodiments are specified by the dependent claims. In general, in a first aspect, a method for recovery of evaporable substances comprises melting of a material comprising evaporable metals and/or evaporable metal compounds into a molten slag. The molten slag is agitated by a submerged jet of hot gas. The hot gas is controlled to have an enthalpy of at least 200 MJ/kmol, and preferably at least 300 MJ/kmol. At least a part of the evaporable metals and/or evaporable metal compounds are fumed off from the molten slag.

In a second aspect, an arrangement for recovery of evaporable substances, comprises a furnace, a heating arrangement, a plasma torch system and a fume handling system. The heating arrangement is arranged for melting a material comprising evaporable metals and/or evaporable metal compounds in the furnace into a molten slag. The plasma torch system is submerged via a tuyere into the molten slag and is arranged for agitating the molten slag by a submerged jet of hot gas. The plasma torch system is adapted to be operated to give the hot gas an enthalpy of at least 200 MJ/kmol, and preferably at least 300 MJ/kmol. The fume handling system is configured to collect the evaporable metals and/or evaporable metal compounds that are fumed off from the molten slag.

One advantage with the present invention is that the required amount of energy for the plasma induced fuming is reduced, while keeping the extraction efficiency on a comparable level. Another advantage is that the need of slag formers is reduced and thereby also the final amount of slag that has to be disposed. Furthermore valuable compounds can be collected in a matte and/or metal phase. Other advantages are described in connection with the different embodiments in the detailed description section.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
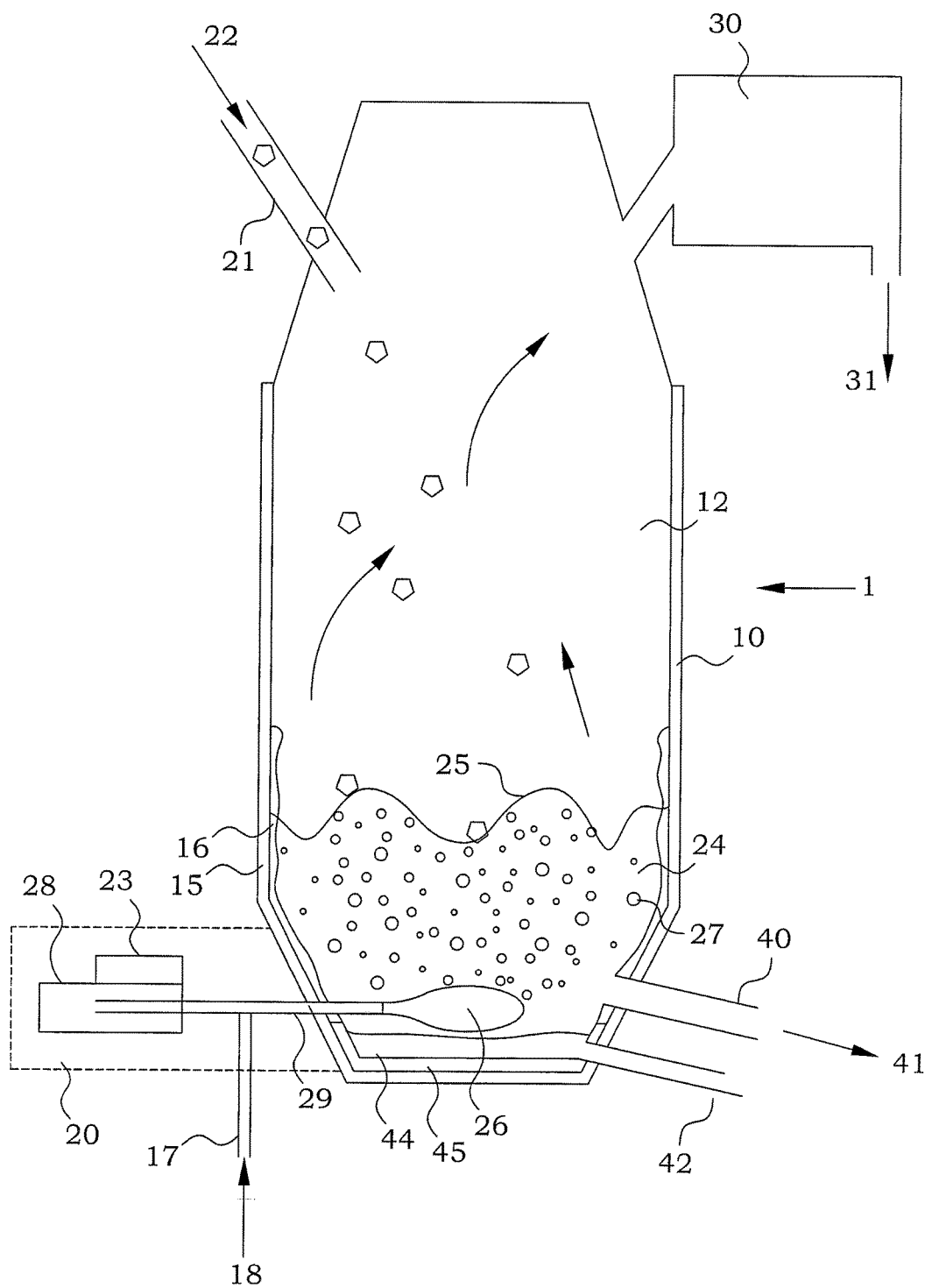
FIG. 1 is a schematic illustration of an arrangement for recovery of evaporable substances.

Throughout the drawings, the same reference numbers are used for similar or corresponding elements.

The invention stated in this patent describes recovery of volatile non-ferrous metals from secondary and primary materials.

The use of submerged plasma torches generating a gas agitating the slag bath and for feeding of reducing agents is known since long. The introduced gas gives a thorough agitation of the melt at the same time as heat is added to the melt. Furthermore, additional substances can be added in the plasma gas, e.g. reducing agents.

An advantage with the use of a submerged plasma torch is that the amount of heat added to the melt is independent of the amount of added reducing agents. In systems, where different carbon compounds are utilized for creating the heat, the oxygen potential and the heat generation will be intimately connected. By use of the plasma torch, virtually any oxygen potential can be combined with any amount of heat generation.

In prior art slag fuming methods, development efforts have been driven by evaluating equilibrium or quasi-equilibrium homogeneous conditions in the slag bath. When the average temperature of the slag is high enough, the slag fuming rate becomes high. Volatile elements leave the slag bath by the upper slag bath surface and enter into the gas phase above the slag.

One idea of the present approach is to instead to utilize dynamic effects and inhomogeneous conditions. If a submerged plasma torch is used, the agitation and the supply of gas into the slag bath cause conditions that are far from homogeneous or equilibrium-like. Such local conditions could be utilized to further improve the fuming properties.

It has also surprisingly been found that by using a submerged plasma torch introducing gas with an extremely high enthalpy, high slag fuming rates are achievable far below the earlier indicated requested average slag temperatures. In other words, even if the average slag temperature is far below the prior art high fuming rate temperatures, volatile elements are efficiently extracted from the slag. This indicates that a completely new fuming mechanism must have been activated.

The gas bubbles with the extreme high enthalpy have surprisingly been seen to extract evaporable substances at very high rate. The life time of a bubble is very short, nevertheless, large amounts of volatile elements anyway have managed to leave the slag to enter into the bubbles. It was found that the boosting effect of the plasma gas became noticeable when the gas entering the slag has an enthalpy of minimum 200 MJ/kmol. Preferably, the gas entering the slag has an enthalpy of minimum 300 MJ/kmol. Enthalpies up to 369 MJ/kmol have been successfully tested. The temperature of the interface between the liquid slag and the gas bubble then becomes much higher than the average slag temperature is. Because of this hot interface, the mass transfer of the elements that are to be fumed is accelerated, giving high fuming rates of metallic and/or oxidic vapours. The high mass transfer of metallic and/or oxidic vapour may furthermore be enhanced by controlling the gas jet from the plasma system. The gas jet can thereby be adapted to give the most suitable oxygen potential and zero partial pressure of the elements/compounds which are to be fumed.

Since the average slag temperature no longer is the crucial critical parameter, the average slag temperature can be selected according to other preferences. For instance, the average slag temperature can be adapted to create a protective freeze lining on the water cooled walls. The average slag temperature can thereby be controlled in dependence of the slag composition to assume a value appropriate for freeze lining. The present approach thus opens an alternative process for high fuming rates at average slag temperatures, even as low as 1100° C. If the slag composition is appropriate, a protective freeze lining will be created on the water cooled walls. Furthermore, no refractory is needed in such a setting, since such a slag is freezing promptly on the surface of the steel walls. The slag is heated to the temperatures needed to create freeze lining by controlling the gas flow of the submerged plasma jet having the mentioned high enthalpies.

As mentioned further above, the plasma jet is also possible to utilize for ensuring strongly agitated slag and for providing ability to work at any oxygen potential at a same energy input.

FIG. 1 illustrates schematically an embodiment of an arrangement 1 for recovery of evaporable substances. The arrangement 1 comprises a furnace 10. Material 22 comprising evaporable metals and/or evaporable metal compounds is introduced through an inlet 21 into the furnace 10. A heating arrangement 20 is arranged for melting the material 22 introduced into the furnace 10 into a molten slag 24. In the present embodiment, the heating arrangement 20 comprises a plasma torch system 28 and a tuyere 29. The plasma torch 28 is thus arranged for supplying the energy necessary for melting the material 22, at least when it reaches the surface 25 of the slag bath. Preferably, the plasma torch system 28 is designed to be capable of producing hot gas of a temperature of above 3000° C., and most preferably above 4000° C.

In alternative embodiments, the heating arrangement 20 may comprise other means turning the material 22 introduced into the furnace 10 into a molten slag 24. One example could be a pneumatic raw material feeding into the slag bath via a tuyere 29. Such heaters are then preferably combined with the effect of the plasma torch system 28 for achieving the melting. Further alternatively, the material 22 could be molten before being entered into the furnace 10.

In the embodiment of FIG. 1, the plasma torch system 28 is via a tuyere 29 submerged into the molten slag 24. The plasma torch system 28 is thereby also arranged for agitating the molten slag 24 by means of a submerged jet 26 of hot gas. The hot gas 27 creates bubbles in the molten slag 24, causing a violent stirring of the molten slag 24 on their way up to the surface 25 of the slag bath. The plasma torch is adapted to be operable to give the hot gas 27 an enthalpy of at least 200 MJ/kmol, and preferably of at least 300 MJ/kmol. By this high enthalpy evaporable metals and/or evaporable metal compounds are fumed off from the molten slag 24 into the bubbles of hot gas 27. A smaller amount of evaporable metals and/or evaporable metal compounds are also fumed off directly into a gas volume 12 above the molten slag surface 25. The bubbles of hot gas 27 are rapidly transported to the molten slag surface 25, and there releasing the content in the hot gas 27 into the gas volume 12.

The present embodiment further comprises a fume handling system 30. The fume handling system 30 is configured to collect the evaporable metals and/or evaporable metal compounds in the gas volume 12 that has been fuming off from the molten slag 24, either directly via the molten slag surface or via the bubbles of hot gas 27. The metals and/or metal compounds are handled in accordance with prior art methods for valuation of the final metals and/or metal compounds 31. The particular way in which the evaporable metals and/or evaporable metal compounds are handled is not crucial for the operation of the slag fuming arrangement as such and is therefore not further discussed.

The present embodiment also comprises a slag outlet 40 allowing molten slag depleted in evaporable metals and/or evaporable metal compounds to be tapped off. The present embodiment of the arrangement 1 has a furnace that is arranged for performing a continuous process. In other words, the present embodiment is intended for a continuous operation, where the material 22 continuously or intermittently is introduced into the furnace 10. The material 22 melts when coming into contact with the hot gas in the gas volume 12 or when being contacted with the molten slag surface 25. During the agitation by the bubbles generated by the plasma torch gas jet 26, the molten slag becomes depleted in evaporable metals and/or evaporable metal compounds, that instead evaporates into the bubbles. The molten slag depleted in evaporable metals and/or evaporable metal compounds may continuously or intermittently be removed from the furnace 10 by the slag outlet 40.

In an alternative embodiment, the furnace 10 can also be operated in a batch manner, where the material 22 first is entered into the furnace 10, then treated into a molten slag depleted in evaporable metals and/or evaporable metal compounds and finally removed from the furnace 10.

In one preferred embodiment, the heating arrangement 20 comprises a controller 23 arranged for operating the heater arrangement 20 for keeping the molten slag 24 at a predetermined average temperature. The predetermined average temperature is preferably selected in dependence of the slag composition. Since most slags are composed to have a melting temperature of around 1100° C., the predetermined average temperature should not exceed such value by too much. For systems having standard slag compositions, the controller 23 is preferably arranged for operating the heater arrangement 20 for keeping the molten slag 24 at an average temperature below 1200° C., and preferably below 1150° C. For other systems, having other slag melting temperatures, the controller 23 is preferably arranged for operating the heater arrangement 20 for keeping the molten slag 24 at an average temperature of less than 100° C. above a melting temperature of the slag, and preferably less than 50° C. above a melting temperature of the slag.

In a preferred embodiment, the furnace 10 is equipped with a cooled wall 15, in order to create a freeze lining and be able to reduce the wear of the furnace wall. The predetermined average temperature of the slag is then also preferably selected in dependence of the performance of the cooled wall 15. The controller 23 is then arranged for balancing the predetermined average temperature of the slag to the reactor wall cooling to create a protective frozen slag layer 16 on the reactor wall 15.

As briefly mentioned above, one of the advantages in using a plasma torch for supplying the energy into a slag bath is that one easily can obtain control of an amount of introduced reduction agents without putting constraints on the total supplied power. In one preferred embodiment, the arrangement 1 further comprises introduction means 17 arranged for adding carbon or hydrocarbon into the tuyeres 29 submerged into the slag bath transporting the hot gas from the plasma jet 26. This enables adjusting of an oxygen potential of the hot gas 27. The oxygen potential is possible to be adjusted within the range of $10^{-4}$ to $10^{-14}$ atm. If the introduced reducing agents reduce the molten slag, such reactions are typically endothermic and further energy has typically to be provided to keep a constant temperature. When using a plasma torch, the controller 23 is easily arranged for controlling the plasma torch to supply the necessary energy for reducing the molten slag.

In combination with the recovery of the volatile metals, also other metals can be extracted from the material 22 introduced into the furnace 10. In one embodiment, the introduction means 17 is arranged for adjusting an oxygen potential in the slag to be suitable for selectively reducing metal compounds in the slag into a molten metal phase. Examples of typical such metals that are possible to reduce from the slag are Cu, Ni, Ag, Au, Pt and Pd. The molten metal phase 44 is collected in the bottom of the furnace 10. The molten metal phase is removed, continuously or intermittently, via an outlet 42. The furnace 10 is for this purpose provided with a refractory 45 at the bottom.

In another embodiment, where the material 22 introduced into the furnace 10 and thereby also the slag comprises sulphur or sulphur compounds, also a matte phase can be obtained. The introduction means 17 is then arranged for adjusting an oxygen potential in the slag for preventing the sulphur from being oxidized. Metals may then be recovered in a molten matte phase. Examples of typical such metals that are possible to recover from the slag are Fe, Cu, Ni, Ag, Au, Pt and Pd. The molten matte phase is collected in the bottom of the furnace 10. The molten matte phase is removed, continuously or intermittently, via an outlet.

In yet another embodiment, both a metal phase and a matte phase can be obtained, by proper adjustment of the oxygen potential and the sulphur content. As a non-limiting example, Au, Pt and Pd can be reduced into a metallic phase, whereas Cu and Ni form the matte phase. The matte phase typically appears on top of the metal phase, since it typically has a lower density than the metal phase and since the two phases are more or less unsolvable in each other. The matte phase and the metal phase can be extracted from the furnace by separate outlets or by a common outlet.

Figure 2:
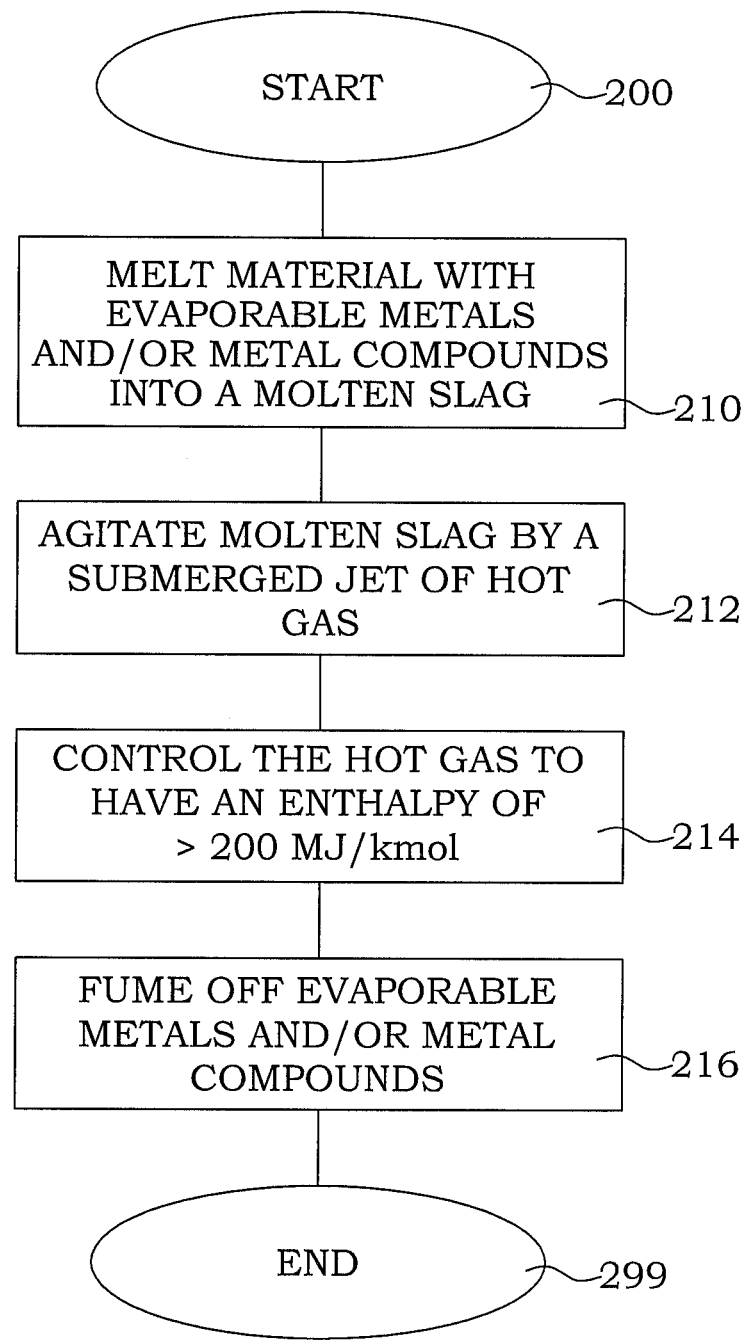
FIG. 2 is a flow diagram of steps of an embodiment of a method for recovery of evaporable substances.

FIG. 2 is a flow diagram of steps of an embodiment of a method for recovery of evaporable substances. The method begins in step 200. In step 210, a material comprising evaporable metals and/or evaporable metal compounds is molten into a molten slag. The molten slag is in step 212 agitated by a submerged jet of hot gas. Preferably, the energy for melting the material is supplied by the submerged jet of hot gas. In step 214, the hot gas is controlled to have an enthalpy of at least 200 MJ/kmol, and preferably at least 300 MJ/kmol. Preferably, the hot gas has a temperature upon entering the molten slag above 3000° C., and preferably above 4000° C. At least for ordinary types of slag compositions, it is preferable to let control the molten slag to have an average temperature below 1200° C., and preferably below 1150° C. Since the slag melting temperature may differ with the actual slag composition, it is preferable to control the molten slag to an average temperature of less than 100° C. above a melting temperature of the slag, and preferably less than 50° C. above a melting temperature of the slag. One advantage of holding the molten slag at these temperatures is that a freeze lining is easier to maintain. At least a part of the evaporable metals and/or evaporable metal compounds is fumed off from the molten slag in step 216. Preferably, a majority part of the evaporation takes place into the hot gas. The energy for fuming of the material is preferably supplied by the submerged jet of hot gas. The process ends in step 299.

In FIG. 2, the process is illustrated as a single batch process. However, in a preferred embodiment, the method is operated as a continuous process. In other words, the different steps are preferably performed at least partially simultaneous and in a continuous or intermittent manner.

Preferably, the method further comprises adjustment of an oxygen potential of the hot gas by adding carbon or hydrocarbon into the hot gas. The oxygen potential can be adjusted within the range of $10^{-4}$ to $10^{-14}$ atm. The energy for reducing the molten slag is supplied by the submerged jet of hot gas.

Test runs have been performed according to the above presented ideas. In one particular experiment the slag was held at a temperature of 1100° C. and hot gas with an enthalpy of 280 MJ/kmol was introduced submerged into the slag. 1000 kg of EAF dust, 100 kg of coke and 100 kg of sand was utilized in this test run as input material. The ingoing material was roasted

TABLE 1

| Input quantities | | | |
|---|---|---|---|
| Material Amount kg: Compound | EAF dust 1000 wt % | Coke 100 wt % | Sand 100 wt % |
| $SiO_2$ | 4.0 | | 85.7 |
| MnO | 2.0 | | |
| $P_2O_5$ | 0.4 | | |
| $Cr_2O_3$ | 0.3 | | |
| NiO | 1.0 | | |
| MgO | 1.9 | | |
| CuO | 0.4 | | |
| Cu | 0.0 | | |
| $TiO_2$ | 0.1 | | |
| $Al_2O_3$ | 0.9 | | 9.8 |
| FeO | 0.0 | | 2.0 |
| $Fe_2O_3$ | 24.7 | | |
| CaO | 4.8 | | 2.5 |
| $Na_2O$ | 1.1 | | |
| $K_2O$ | 0.3 | | |
| ZnO | 41.1 | | |

TABLE 1-continued

| Input quantities | | | |
|---|---|---|---|
| Material Amount kg: Compound | EAF dust 1000 wt % | Coke 100 wt % | Sand 100 wt % |
| Zn | 0.0 | | |
| PbO | 4.7 | | |
| Pb | 0.0 | | |
| C | 2.2 | 99.6 | |
| S | 0.0 | 0.4 | |
| $H_2O$ | 5.1 | 0.0 | |
| KCl | 2.9 | | |
| NaCl | 1.5 | | |
| $SO_3$ | 0.0 | | |
| O | 0.5 | | |
| SUM | 100.0 | 100.0 | 100.0 |

TABLE 2

| Output quantities | | | | |
|---|---|---|---|---|
| Material Amount kg: Compound | Metal 6.9 wt % | Slag 491.6 wt % | Gas 701.5 wt % | Recovered product 495.6 wt % |
| $SiO_2$ | | 25.5 | | |
| MnO | | 4.0 | | |
| $P_2O_5$ | | 0.7 | | |
| $Cr_2O_3$ | | 0.7 | | |
| NiO | | 0.8 | | |
| Ni | 68.7 | | | |
| MgO | | 3.9 | | |
| CuO | | 0.2 | | |
| Cu | 31.3 | | | |
| $TiO_2$ | | 0.1 | | |
| $Al_2O_3$ | | 3.9 | | |
| FeO | | 45.6 | | |
| $Fe_2O_3$ | | 0.0 | | |
| CaO | | 10.2 | | |
| $Na_2O$ | | 2.3 | | |
| $H_2O$ | | 0.7 | | |
| ZnO | | 1.3 | | 81.6 |
| Zn | | | 46.3 | |
| PbO | | 0.0 | | 9.5 |
| Pb | | | 6.2 | |
| C | | | 17.4 | |
| $H_2O$ (vapour) | | | 3.7 | |
| KCl | | | 4.1 | 5.8 |
| NaCl | | | 2.2 | 3.0 |
| O | | | 19.6 | |
| $SO_2$ | | | 0.1 | |
| H | | | 0.4 | |
| SUM | 100 | 100 | 100 | 100 | prior to feeding to remove the sulphur from the material. The compositions of the components are given in Table 1. Note that the plasma gas and reducing agents are not included in the balance calculations. During the operation, a total of 701.5 kg of gas was extracted, from which 495.6 kg recovered products eventually was collected. In this particular experiment, the oxygen potential was held at a level appropriate for reducing the CuO into metallic copper, and $Fe_2O_3$ into FeO, while Zn and Pb were extracted in the gas phase. Air was used as the plasma gas and the oxygen potential was controlled by introducing propane into the hot gas. The output of the experiment is shown in Table 2. As a conclusion, the level of ZnO was in the present test run reduced from 41.1 wt % in the EAF dust to 1.3 wt % in the final slag, which corresponds to an extraction degree of 98.4%. Such levels of Zn extraction has earlier only been achieved at slag temperatures over 1300° C.

In another particular experiment the slag was again held at a temperature of 1100° C. and hot gas with an enthalpy of 280 MJ/kmol was introduced submerged into the slag. 1000 kg of EAF dust, 100 kg of coke and 100 kg of sand was utilized in this test run as input material. The compositions of the components are given in Table 3. S and $SO_3$ are present in the system. Note that the plasma gas and reducing agents are not included in the balance calculations. During the operation, a total of 704.3 kg of gas was extracted, from which 485.5 kg recovered products, mainly ZnO, was collected. In this particular experiment, the oxygen potential was held at a level appropriate to prevent sulphur oxidation, therefore recovering the Cu and Ni, respectively, into copper-nickel matte, and $Fe_2O_3$ into FeO and FeS, while Zn and Pb were extracted in the gas phase partially as metal vapours. Air was used as the plasma gas and the oxygen potential was controlled by introducing propane into the hot gas jet. The output of the experiment is shown in Table 4. As a conclusion, the level of ZnO in the present test run was reduced from 40.3 wt % in the EAF dust to 1.3 wt % in the final slag, which corresponds to an extraction degree of 98.5%.

TABLE 3

Input quantities

| Material<br>Amount kg:<br>Compound | EAF dust<br>1000<br>wt % | Coke<br>100<br>wt % | Sand<br>100<br>wt % |
|---|---|---|---|
| $SiO_2$ | 3.9 | | 85.7 |
| MnO | 1.9 | | |
| $P_2O_5$ | 0.3 | | |
| $Cr_2O_3$ | 0.3 | | |
| NiO | 1.0 | | |
| MgO | 1.9 | | |
| CuO | 0.4 | | |
| Cu | 0.0 | | |
| $TiO_2$ | 0.1 | | |
| $Al_2O_3$ | 0.9 | | 9.8 |
| FeO | 0.0 | | 2.0 |
| $Fe_2O_3$ | 24.2 | | |
| CaO | 4.7 | | 2.5 |
| $Na_2O$ | 1.1 | | |
| $K_2O$ | 0.3 | | |
| ZnO | 40.3 | | |
| Zn | 0.0 | | |
| PbO | 4.6 | | |
| Pb | 0.0 | | |
| C | 2.2 | 99.6 | |
| S | 0.6 | 0.4 | |
| $H_2O$ | 5.0 | 0.0 | |
| KCl | 2.8 | | |
| NaCl | 1.5 | | |
| $SO_3$ | 1.5 | | |
| O | 0.5 | | |
| SUM | 100.0 | 100.0 | 100.0 |

TABLE 4

Output quantities

| Material<br>Amount kg:<br>Compound | Matte<br>17.1<br>wt % | Slag<br>478.6<br>wt % | Gas<br>704.3<br>wt % | Recovered product<br>485.5<br>wt % |
|---|---|---|---|---|
| $SiO_2$ | | 26.0 | | |
| MnO | | 4.0 | | |
| $P_2O_5$ | | 0.7 | | |
| $Cr_2O_3$ | | 0.7 | | |
| NiO | | 0.8 | | |
| NiS | 42.2 | | | |
| MgO | | 3.9 | | |
| CuO | | 0.2 | | |
| $Cu_2S$ | 15.3 | | | |
| $TiO_2$ | | 0.1 | | |
| $Al_2O_3$ | | 4.0 | | |
| FeO | | 44.7 | | |
| FeS | | 42.5 | | |
| CaO | | 10.3 | | |
| $Na_2O$ | | 2.3 | | |
| $K_2O$ | | 0.7 | | |
| ZnO | | 1.3 | | 81.6 |
| ZnS | 0.0 | | | |
| Zn | | | 45.2 | |
| PbO | | 0.0 | | 9.5 |
| PbS | 0.0 | | | |
| Pb | | | 6.1 | |
| C | | | 17.3 | |
| $H_2O$ (vapour) | | | 3.6 | |
| KCl | | | 4.0 | 5.8 |
| NaCl | | | 2.1 | 3.0 |
| O | | | 19.8 | |
| $SO_2$ | | | 1.5 | |
| S | | 0.2 | | |
| H | | | 0.4 | |
| SUM | 100 | 100 | 100 | 100 |

Minor amounts of platinum group metals and noble metals were also present in the experiments presented above. It was found that at least 98% of the Au, Pt and Pd were recovered into the metal or matte phase. The Ag was collected to 50-60% in the metal or matte phase, while 40-50% ended up in the filter cake.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for recovery of evaporable substances, comprising the steps of:
   melting a material comprising at least one of evaporable metals and evaporable metal compounds into a molten slag;
   agitating said molten slag by a submerged jet of hot gas;
   fuming off at least a part of said at least one of evaporable metals and evaporable metal compounds from said molten slag; and
   controlling said hot gas to have an enthalpy of at least 200 MJ/kmol,
   wherein said molten slag has an average temperature of less than 100° C. above the melting temperature of said slag.

2. The method according to claim 1, wherein said step of fuming off at least a part of said at least one of evaporable metals and evaporable metal compounds from said molten slag comprises evaporation of said at least one of evaporable metals and evaporable metal compounds into said hot gas.

3. The method according to claim 1, wherein said molten slag has an average temperature of less than 50° C. above said melting temperature of said slag.

4. The method according to claim 1, wherein said molten slag has an average temperature below 1200° C.

5. The method according to claim 1, wherein said hot gas has a temperature upon entering said molten slag above 3000° C.

6. The method according to claim 1, wherein the energy for melting said material and/or fuming off at least a part of said at least one of evaporable metals and evaporable metal compounds from said molten slag is supplied by said submerged jet of hot gas.

7. The method according to claim 1, further comprising adjusting an oxygen potential of said hot gas by adding carbon or hydrocarbon into said hot gas.

8. The method according to claim 1, further comprising adjusting an oxygen potential in said slag by adding solid carbon and/or hydrocarbon into said slag.

9. The method according to claim 7, wherein said oxygen potential is adjusted within the range of $10^{-4}$ to $10^{-14}$ atm.

10. The method according to claim 7, wherein said step of adjusting an oxygen potential of said hot gas adjusts an oxygen potential in said slag to reduce metal compounds in said slag into a molten metal phase;
and wherein the method comprises the further step of removing said molten metal phase.

11. The method according to claim 7, wherein
said slag comprises sulphur or sulphur compounds; and
said step of adjusting an oxygen potential of said hot gas adjusts an oxygen potential in said slag to prevent sulphur from being oxidized, and wherein the method further comprises collecting metal compounds in said slag into a molten matte phase and removing said molten matte phase.

12. The method according to claim 1, wherein energy for reducing said molten slag is supplied by said submerged jet of hot gas.

13. The method according to claim 1, wherein the method is a continuous process.

14. The method according to claim 8, wherein said oxygen potential is adjusted within the range of $10^{-4}$ to $10^{-14}$ atm.

15. The method according to claim 8, wherein said step of adjusting an oxygen potential in said slag comprises adjusting an oxygen potential in said slag for reducing metal compounds in said slag into a molten metal phase;
and wherein the method comprises the further step of removing said molten metal phase.

16. The method according to claim 8, wherein
said slag comprises sulphur or sulphur compounds; and
said step of adjusting an oxygen potential in said slag comprises adjusting an oxygen potential in said slag for preventing sulphur from being oxidized, and wherein the method further comprises collecting metal compounds in said slag into a molten matte phase and removing said molten matte phase.

17. The method according to claim 1, wherein said hot gas is controlled to have an enthalpy of at least 300 MJ/kmol.

18. The method according to claim 1, wherein said molten slag has an average temperature below 1150° C.

19. The method according to claim 1, wherein said hot gas has a temperature upon entering said molten slag above 4000° C.

20. A method for recovery of evaporable substances, comprising the steps of:
melting a material comprising at least one of evaporable metals and evaporable metal compounds into a molten slag;
agitating said molten slag by a submerged jet of hot gas;
fuming off at least a part of said at least one of evaporable metals and evaporable metal compounds from said molten slag; and
controlling said hot gas to have an enthalpy of at least 200 MJ/kmol,
wherein the hot gas comprises air.

21. The method according to claim 20, wherein an oxygen potential of said hot gas is adjusted within a range of $10^{-4}$ to $10^{-14}$ atm.

22. The method according to claim 20, wherein an oxygen potential of said hot gas is adjusted within a range of $10^{-4}$ to $10^{-14}$ atm by adding carbon or hydrocarbon into said hot gas.

23. The method according to claim 20, wherein said molten slag has an average temperature of less than 100° C. above a melting temperature of said slag.

24. The method according to claim 20, wherein said molten slag has an average temperature of less than 50° C. above a melting temperature of said slag.

* * * * *

UNITED STATES PATENT AND TRADEMARK OFFICE
CERTIFICATE OF CORRECTION

PATENT NO. : 10,006,100 B2
APPLICATION NO. : 14/429561
DATED : June 26, 2018
INVENTOR(S) : Matej Imris et al.

Page 1 of 1

It is certified that error appears in the above-identified patent and that said Letters Patent is hereby corrected as shown below:

On the Title Page

Item [30], change "1251067" to --1251067-3--.

Signed and Sealed this
Twenty-fifth Day of September, 2018

Andrei Iancu
*Director of the United States Patent and Trademark Office*